United States Patent
Vargas et al.

(10) Patent No.: US 7,809,384 B2
(45) Date of Patent: Oct. 5, 2010

(54) USER-INPUT SCHEDULING OF SYNCHRONIZATION OPERATION ON A MOBILE DEVICE BASED ON USER ACTIVITY

(75) Inventors: Sandra I. Vargas, Sammamish, WA (US); David R. Williamson, Duvall, WA (US); Gary W. Hall, Redmond, WA (US); Michael A. Foster, Redmond, WA (US); Juan V. Esteve Balducci, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 1304 days.

(21) Appl. No.: 10/641,380

(22) Filed: Aug. 14, 2003

(65) Prior Publication Data

US 2004/0109436 A1  Jun. 10, 2004

Related U.S. Application Data

(60) Provisional application No. 60/424,177, filed on Nov. 5, 2002.

(51) Int. Cl.
*H04B 7/00* (2006.01)
*H04B 15/00* (2006.01)

(52) U.S. Cl. .......... 455/502; 455/501; 455/503; 370/324; 370/350; 370/395.62; 709/212; 709/213; 375/356

(58) Field of Classification Search .......... 455/501, 455/502, 503; 370/324, 350, 395.62, 479, 370/503, 509; 709/212, 213, 216, 248; 375/356
See application file for complete search history.

(56) References Cited

U.S. PATENT DOCUMENTS

| | | | | |
|---|---|---|---|---|
| 5,509,027 A | * | 4/1996 | Vook et al. | 375/134 |
| 5,583,866 A | * | 12/1996 | Vook et al. | 375/134 |
| 5,684,990 A | * | 11/1997 | Boothby | 707/203 |
| 6,034,621 A | * | 3/2000 | Kaufman | 340/7.21 |
| 6,816,510 B1 | * | 11/2004 | Banerjee | 370/503 |
| 6,901,434 B1 | * | 5/2005 | Lunsford et al. | 709/216 |
| 2002/0159416 A1 | * | 10/2002 | Kazmi et al. | 370/335 |
| 2002/0177442 A1 | * | 11/2002 | Nagashima | 455/435 |
| 2003/0084108 A1 | * | 5/2003 | Syed | 709/206 |
| 2003/0220966 A1 | * | 11/2003 | Hepper et al. | 709/203 |

\* cited by examiner

*Primary Examiner*—Tuan H Nguyen
(74) *Attorney, Agent, or Firm*—Westman, Champlin & Kelly, P.A.

(57) ABSTRACT

Data is synchronized between a mobile device and a computing device over a wireless link. Synchronization operations are scheduled according to a synchronization schedule that is based on a current time of day.

26 Claims, 13 Drawing Sheets

Diagrams & Flowcharts:
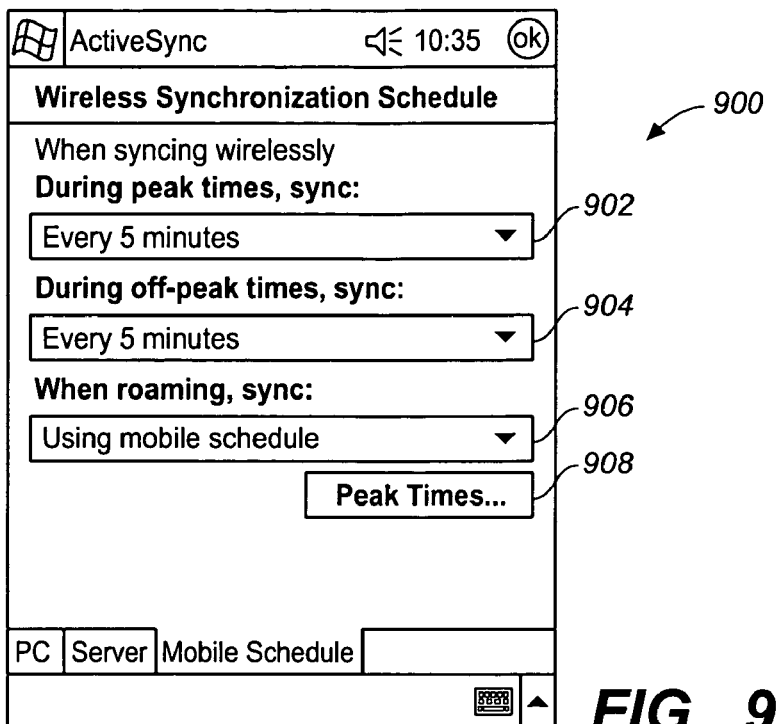
FIG._9
Real-Time Response
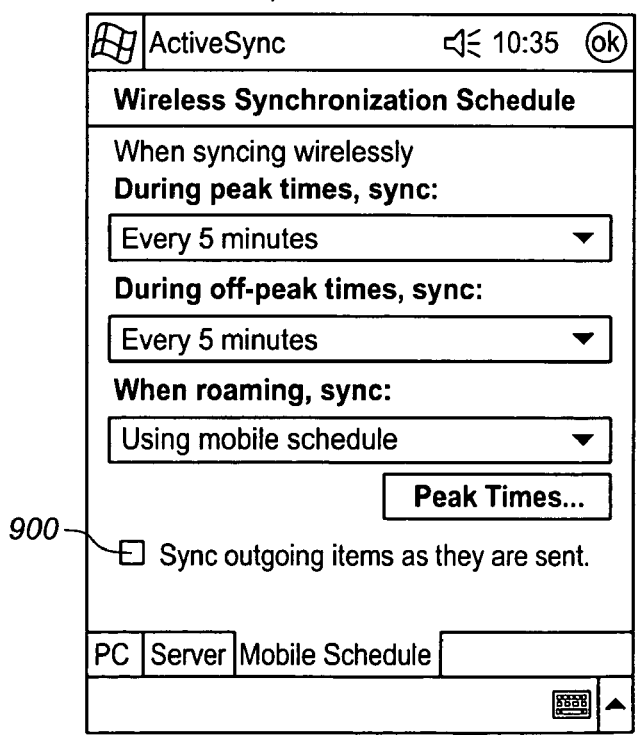
FIG._12A

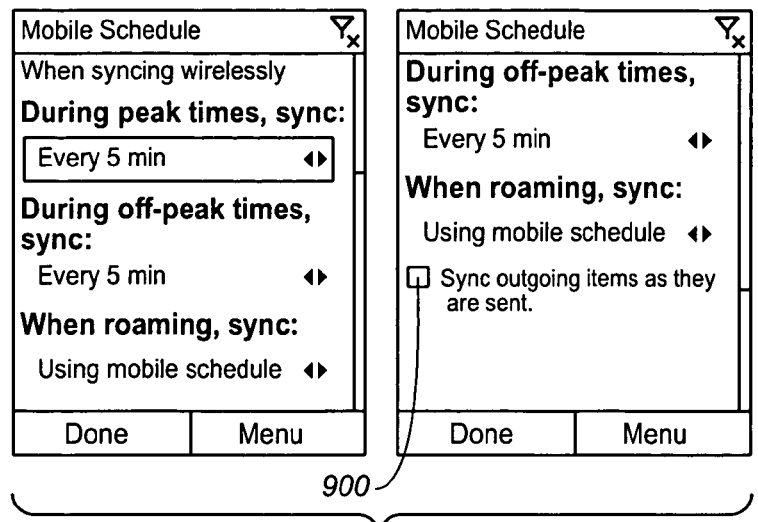
FIG._12B
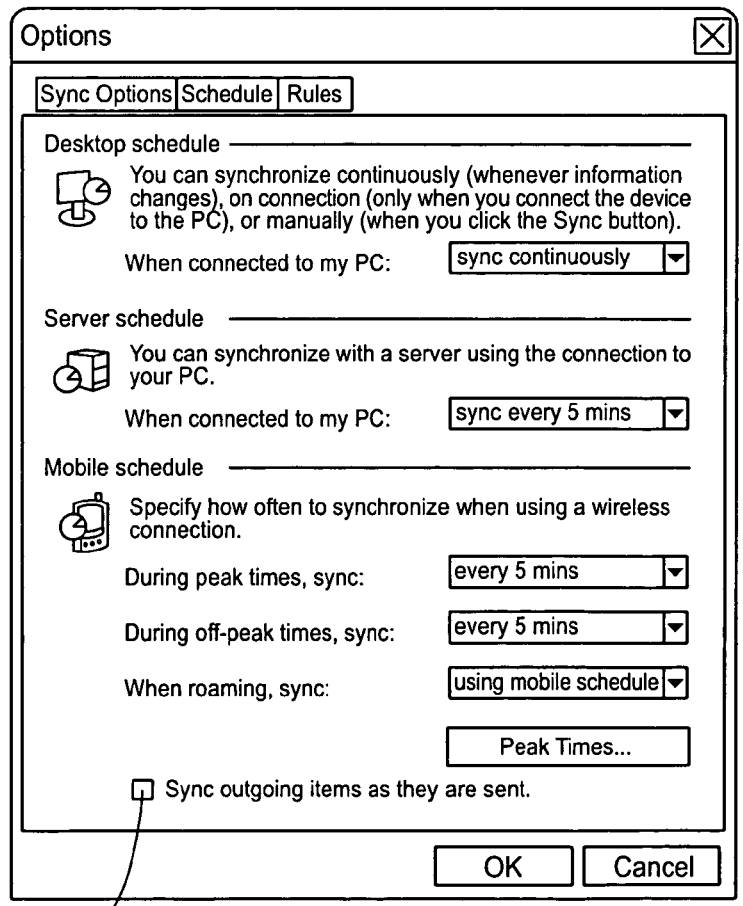
FIG._12C

USER-INPUT SCHEDULING OF SYNCHRONIZATION OPERATION ON A MOBILE DEVICE BASED ON USER ACTIVITY

The present application is based on and claims the benefit of U.S. provisional patent application Ser. No. 60/424,177, filed Nov. 5, 2002, the content of which is hereby incorporated by reference in its entirety.

BACKGROUND OF THE INVENTION

The present invention relates to synchronization of objects between object stores on two different computing devices. More particularly, the present invention relates to scheduling of synchronization operations on mobile devices.

Mobile devices include a broad range of computing and communication devices that are small enough to be conveniently carried by a user. Examples of such devices include mobile phones, personal digital assistants, tablet PCs, and lap-top PCs.

Generally, the mobile device includes a processor, random access memory (RAM), and an input device such as a keyboard, touchpad or input buttons and a display. The keyboard can be integrated with the display, such as when the keyboard is incorporated as a touch sensitive display. A communication interface is optionally provided and is commonly used to communicate with other computers. A replaceable or rechargeable battery powers the mobile device. Optionally, the mobile device can receive power from an external power source that overrides or recharges the built-in battery.

While a wide variety of computing tasks and applications can be performed by such mobile devices, personal information managers (PIMs) are particularly well suited to mobile devices. PIMs typically comprise applications which enable the user of the mobile device to better manage scheduling and communications, and other such tasks. Some commonly available PIMs include scheduling and calendar programs, task lists, address books, and electronic mail (e-mail) programs. Some commonly commercially available PIMs are sold under the trademarks "MICROSOFT SCHEDULE+" and "MICROSOFT OUTLOOK" and are commercially available from Microsoft Corporation of Redmond, Wash. In addition to PIMs, however, such mobile devices may also run different types of applications, such as word processors, spread sheets, etc.

To provide users with as much freedom as possible, it is desirable to allow the user to access and change their application and PIM information from any device they choose. Thus, the user should be able to access their e-mail from a network terminal, a PDA, and a tablet PC, for example.

However, allowing the user to access and change their information from any desired source means that the devices must be able to communicate with each other to indicate changes to the information. The process of two devices sharing changes in the application and/or PIM information is known as synchronization.

In general, synchronization is not a continuous process. In other words, a mobile device does not continually try to synchronize its data because that would waste limited wireless bandwidth and place an undue drain on the mobile device's battery. Instead, synchronization is performed periodically. In addition, since the mobile device is not always in use, it is wasteful to have a server or desktop computer periodically attempt to establish a connection with the mobile device to perform synchronization. Instead, the mobile device is responsible for establishing a connection to perform synchronization.

When scheduling synchronization operations through a wireless connection, such as a cellular connection, a number of concerns present themselves. First, it can be desirable to have data be as up-to-date as possible. This requires synchronization (sync) to be performed frequently. However, the synchronization process does require a relatively high amount of power and can thus affect the remaining battery life of the mobile device. Similarly, cellular connection charges often apply. Since frequent sync operations require frequent cellular connection to a synchronization server, the costs associated with these connections can become relatively large. Also, cellular connection costs can increase rather significantly, when connection is made to a roaming mobile device. Thus, frequent sync operations, requiring frequent connections during roaming, can also undesirably increase the cost of synchronization.

SUMMARY OF THE INVENTION

Data is synchronized between a mobile device and a computing device over a wireless link. Synchronization operations are scheduled according to a synchronization schedule that is based on a current time of day.

In one embodiment, the day can be divided into different time periods by the user. The user can also specify the frequency with which synchronization operations are to be performed during each specified period. Further, the user can specify an override schedule which overrides the ordinary synchronization schedule established by the user when override criteria are present. For instance, if the mobile device is roaming, the synchronization schedule will be dictated by the override schedule, which may sync much less often, or not until a specific user synchronization request has been received.

The present invention can be embodied both as a method and as a apparatus. Also, the user interface associated with the present invention provides for user input to specify time periods during the day, synchronization frequency information, and an override schedule.

BRIEF DESCRIPTION OF THE DRAWINGS

FIG. 9 illustrates one embodiment of a user interface in accordance with the present invention.

FIGS. 12A-12C show user interfaces for selecting a real time response feature in accordance with different embodiments of the present invention.

DETAILED DESCRIPTION OF THE ILLUSTRATIVE EMBODIMENTS

Overview

Figure 1:
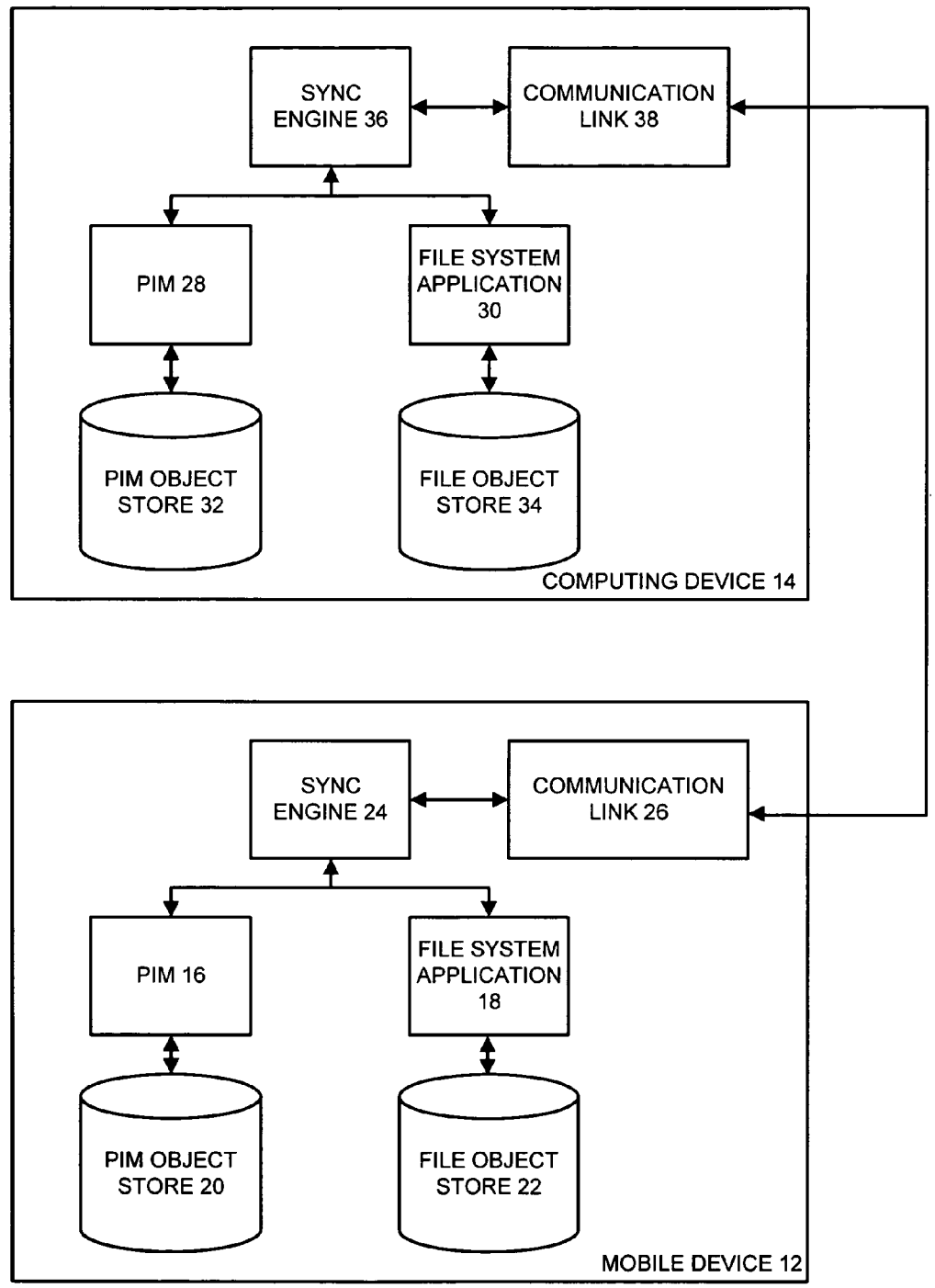
FIG. 1 is a block diagram illustrating a basic environment of the present invention.

FIG. 1 is a block diagram of a typical system or environment 10 in which the present invention operates. Scheduling of synchronization operations is discussed in detail later, but the present overview is provided for clarity only. System 10 includes mobile device 12 and a computing device 14. Mobile device 12 includes first application program 16, second application program 18, corresponding first and second object stores 20 and 22, synchronization engine 24 and communication link 26. Computing device 14 includes first and second application programs 28 and 30, corresponding first and second object stores 32 and 34, synchronization engine 36 and communication link 38. It will be appreciated that both mobile device 12 and computing device 14 include a number of other components (including, for example, components and timers used to schedule synchronization operations), which are discussed in greater detail below. However, for the purposes of the overview discussion presented with respect to FIG. 1, the items set out above are sufficient.

In one illustrative embodiment of the present invention, application programs 16 and 28 are personal information manager (PIM) programs, which support, for example, electronic mail messaging, scheduling, calendering, etc. Hereinafter, programs 16 and 28 will simply be referred to as PIMs 16 and 28. Of course, PIMs 16 and 28 can be configured to support a wide variety of other features, such as task lists and personalized address books, to name a few.

Object stores 20 and 32 are implemented in memory configured to store a plurality of individual records or objects, each comprising a plurality of fields or properties related to PIMs 16 and 28. In one illustrative embodiment, PIMs 16 and 28 are programs, such as that available under the commercial designation "MICROSOFT OUTLOOK", and object stores 20 and 23 are configured to store objects, each of which having a plurality of attributes or properties associated with electronic mail messaging, such as a sender's name, the recipient's name, text messages, etc. Computing device 14 executes PIM 28 to maintain objects stored in store 32, and mobile device 12 executes program 16 to maintain objects stored in object store 20. In one illustrative embodiment, each object in object store 20 comprises the same set of properties or attributes stored in object store 32, or a subset of those properties or attributes.

Similarly, application programs 18 and 30 maintain objects on associated object stores 22 and 34, respectively. In one illustrative embodiment, application programs 18 and 30 are file system applications, such as those available under the commercial designation "MICROSOFT WORD". It should also be noted that any suitable number of other application programs, and associated object stores, can be provided on mobile device 12 and computing device 14. However, for the sake of simplicity, only programs 16, 18, 28 and 30, and their associated object stores, are described herein.

In one illustrative embodiment, the user desires to synchronize object stores 20 and 32 and object stores 22 and 34. Thus, there are two instances of each object associated with the pair of object stores 20 and 32 (one instance in object store 20 and one instance in object store 32) and two instances of each object associated with the pair of object stores 22 and 34 (one instance in object store 22 and one instance in object store 34). When a user changes one instance of the object stored in either object store 22 or 34, the second instance of that object in the other of stores 22 and 34 is out of sync and is desirably updated the next time mobile device 12 has two-way communication with computing device 14, so that both instances of the same object contain synchronized data. The same is true for instances of objects stored in object stores 20 and 32.

In order to accomplish synchronization, synchronization components 24 and 36 run on mobile device 12 and computing device 14, respectively. The synchronization components communicate with application programs 16, 18, 28 and 30 (or directly with the associated object stores) through any well defined interfaces to manage communication and synchronization.

Synchronization components 24 and 36 communicate with each other through communication links 26 and 38. Communication links 26 and 38 are illustratively commercially available communication links using a suitable communications protocol. For instance, in one illustrative embodiment, mobile device 12 is connected to computing device 14 with a physical cable which communicates using a serial communications protocol. Other communication mechanisms are also contemplated by the present invention, such as infrared (IR) communication, direct modem communication, remote dial-up-networking communication, communication through commercially available network cards (i.e., using TCP/IP), remote access services (RAS), wireless modem, wireless cellular digital packet data (CDPD), short message services or other suitable communication mechanisms. Although the communication links are shown as being internal to mobile device 12 and computing device 14, those skilled in the art will recognize that portions of the communication links exist outside of the devices. For example, the communication links can include communication servers located between mobile device 12 and computing device 14, other portions of the network forming the communication link (such as the cellular and PSTN networks) and adapters such as mobile device cradles.

Prior to discussing the synchronization process and associated mechanisms in greater detail, the present discussion proceeds with respect to a more detailed description of the components of mobile device 12 and an example computing device 14 for the sake of clarity.

Computing Device 14

Computing device 14 is only one example of a suitable computing device and is not intended to suggest any limitation as to the scope of use or functionality of the invention. Neither should computing device 14 be interpreted as having any dependency or requirement relating to any one or combination of components illustrated in the exemplary computing device 14.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
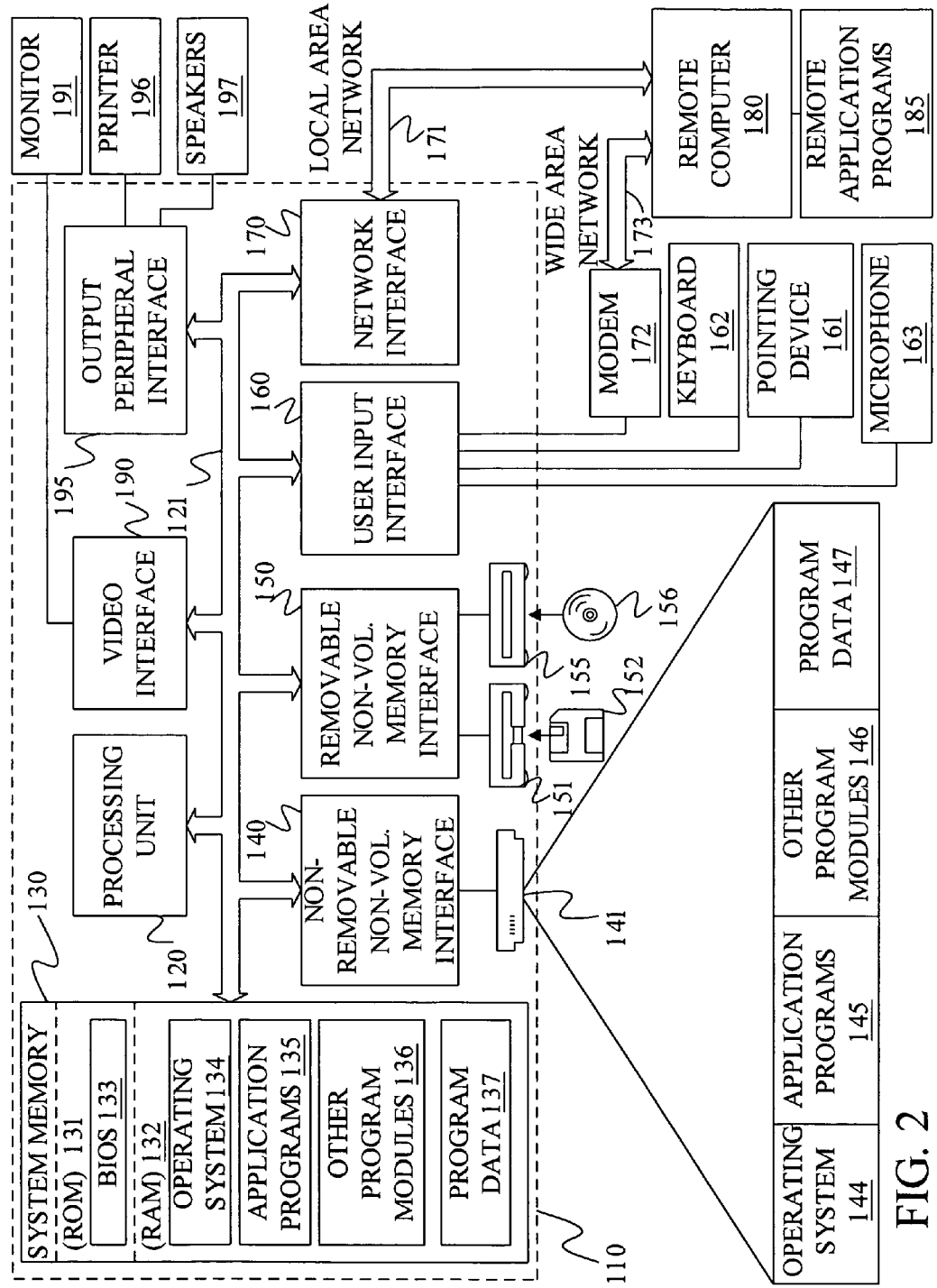
FIG. 2 is a block diagram of one embodiment of a conventional desktop computer used in conjunction with a mobile device in accordance with the present invention.

With reference to FIG. 2, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180, which can include mobile device 12. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet. In addition, the network connections between any of the nodes in the network may include direct cable connections or wireless connections and the connection between computer 110 and remote computer 180 may include any number of nodes and/or routers.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

Dynamically linked libraries (DLLs), comprising a plurality of executable functions are associated with PIM 28 and application 30 for execution by processor 62. Interprocessor and intercomponent calls are facilitated preferably using the component object model (COM) as is common in programs written for Microsoft "WINDOWS" brand operating systems. Briefly, when using COM, a software component such as a DLL has a number of interfaces. Each interface exposes a plurality of methods, which can be called individually to utilize different services offered by the software component. In addition, interfaces are provided such that methods or functions can be called from other software components which optionally receive and return one or more parameter arguments.

In general, the DLLs associated with PIM 28 and program 30 are designed specifically to work in conjunction with PIM 28 and program 30 and to expose desktop synchronization interfaces that function according to a synchronization protocol. The DLLs, in turn, call interfaces exposed by PIM 28 and program 30 in order to access data representing individual properties of objects maintained in object stores 32 and 34. Object stores 32 and 34, of course, can reside in any one of the suitable memory components described with respect to FIG. 2.

Mobile Device 12

Figure 3:
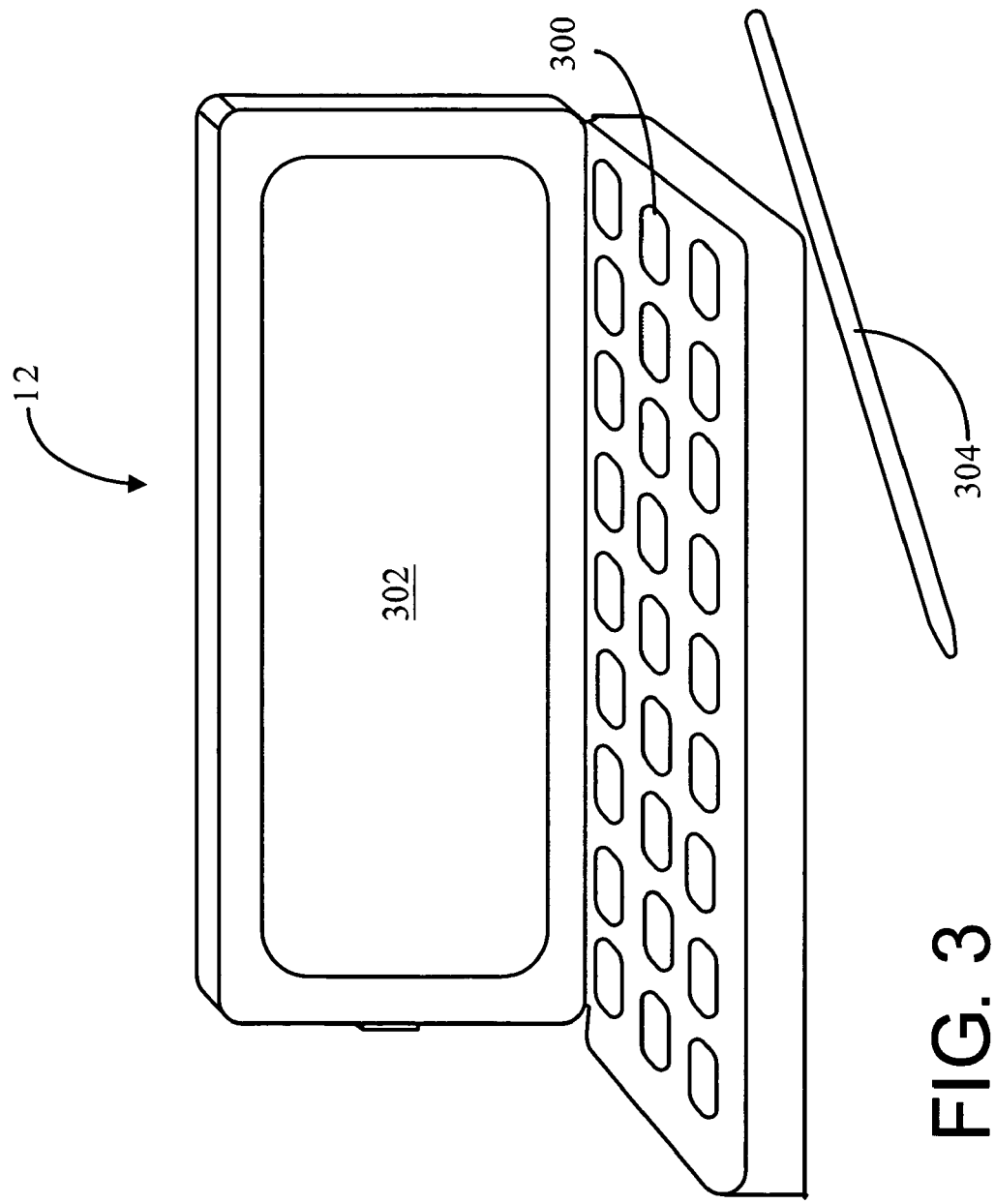
FIG. 3 is a simplified pictorial illustration of one embodiment of a mobile device in accordance with the present invention.

FIG. 3 is a simplified pictorial illustration of one preferred embodiment of a mobile device 12 which can be used in accordance with the present invention. In one embodiment, mobile device 12 includes a miniaturized keyboard 300, display 302 and stylus 304. In the embodiment shown in FIG. 3, display 302 is a liquid crystal display (LCD) which uses a contact sensitive display screen in conjunction with stylus 304. Stylus 304 is used to press or contact the display 302 at designated coordinates to accomplish certain user input functions. Miniaturized keyboard 300 is illustratively implemented as a miniaturized alpha-numeric keyboard, with any suitable and desired function keys which are also provided for accomplishing certain user input functions.

Figure 4:
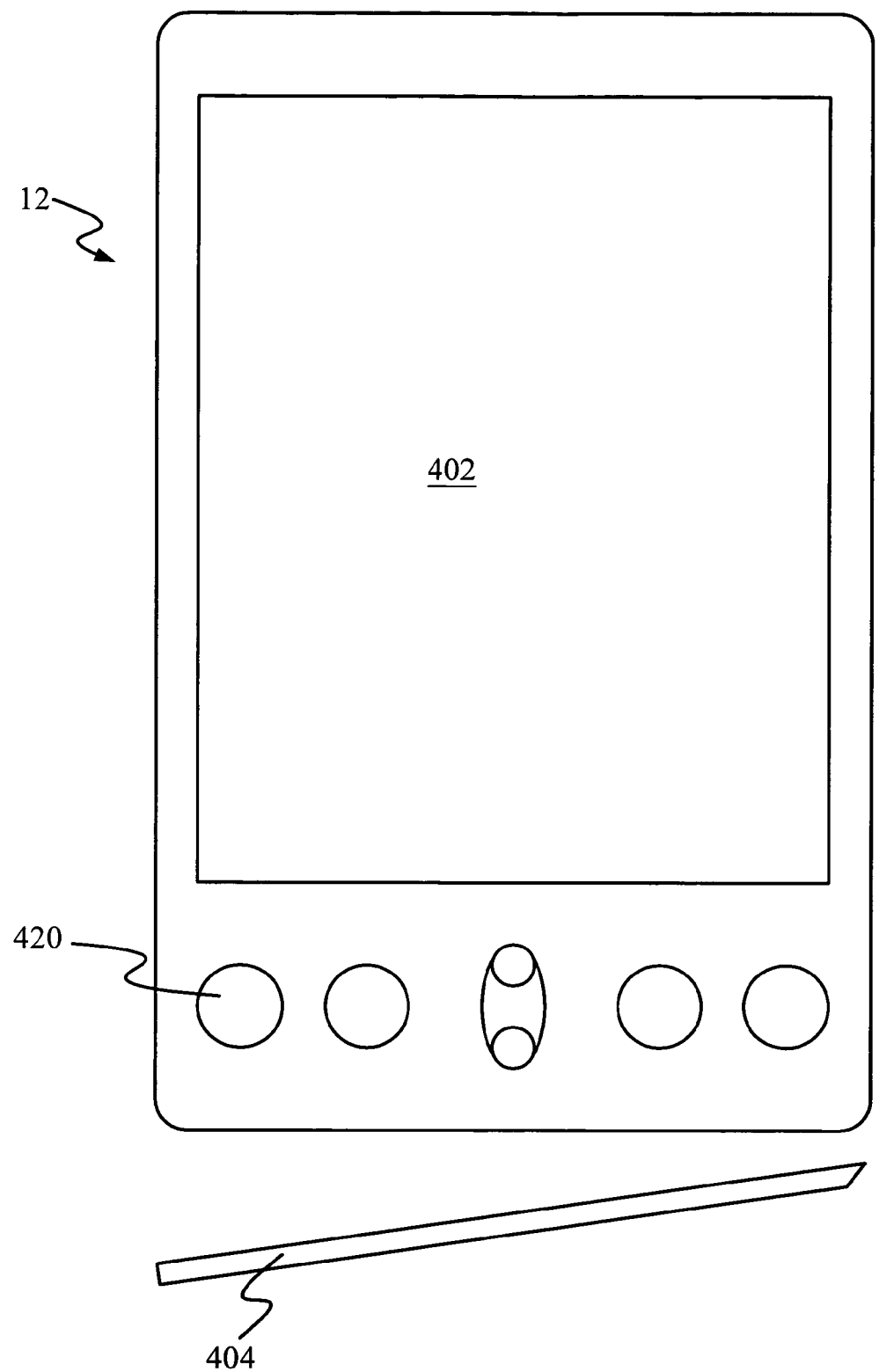
FIG. 4 is a simplified pictorial illustration of another embodiment of a mobile device in accordance with the present invention.

FIG. 4 is an illustration of a different embodiment of mobile device 12. Mobile device 12, as shown in FIG. 4, includes a touch sensitive screen 402 which can be used, in conjunction with stylus 404, to accomplish certain user input functions.

It should be noted that the displays 302 and 402 for the mobile devices shown in FIGS. 3 and 4 can be the same size as one another, or different sizes from one another, but would typically be much smaller than a conventional display used with a desktop computer. For example, displays 302 and 402 shown in FIGS. 3 and 4 may be defined by a matrix of only 240×320 coordinates, or 160×160 coordinates, or any other suitable size. When mobile device 12 is a pager, the display may be even smaller.

The mobile device 12 shown in FIG. 4 also includes a number of user input keys or buttons (such as button 420) which allow the user to scroll through menu options or other display options which are displayed on display 402, or which allow the user to change applications or select user input functions, without contacting display 402.

Note that other forms of the mobile device are possible under the present invention. Examples include mobile phones that are capable of performing computing tasks, tablet PCs and wireless-enabled laptop computers, to name a few.

Figure 5:
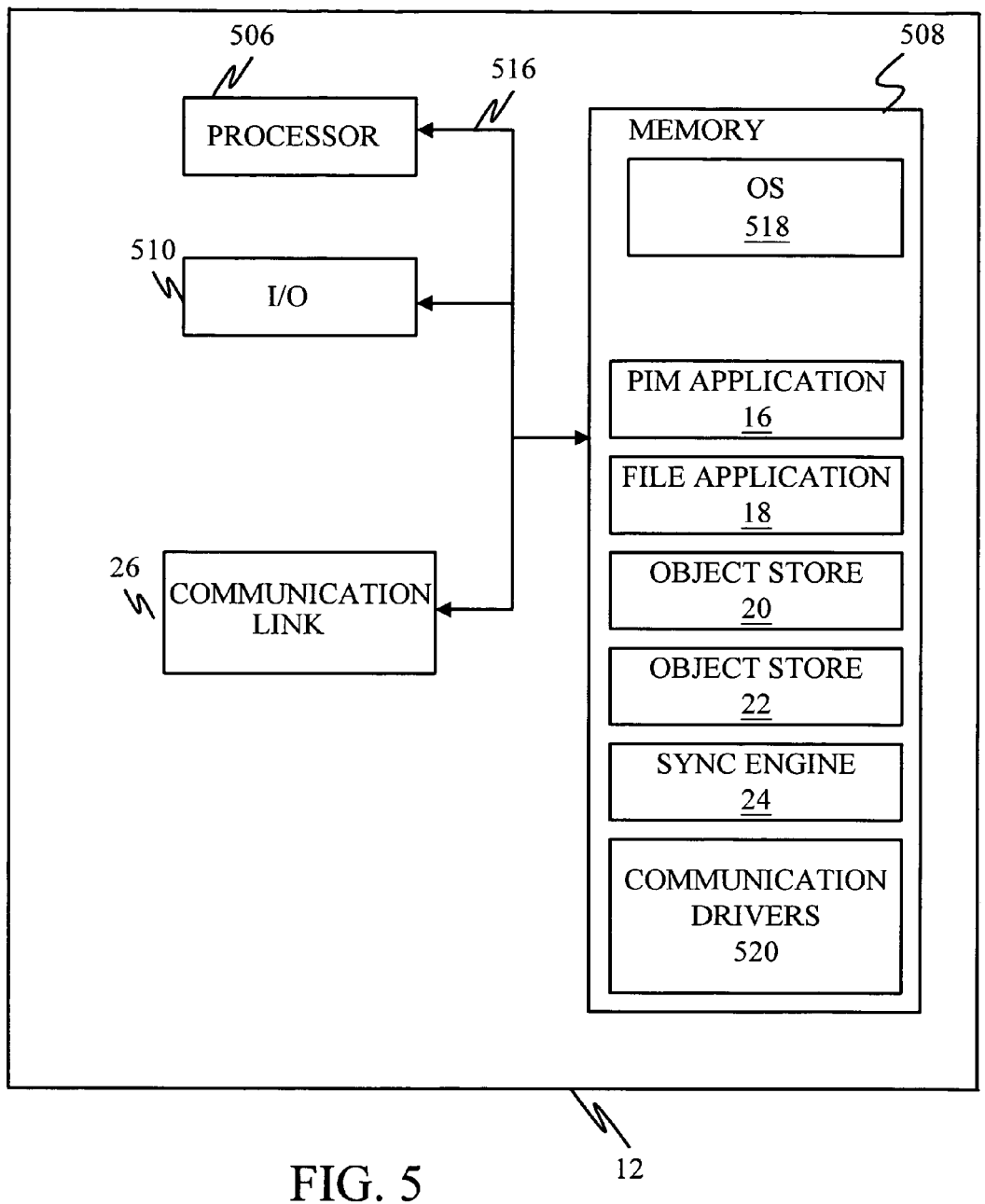
FIG. 5 is a simplified block diagram of one embodiment of the mobile device shown in FIG. 3 or 4.

FIG. 5 is a more detailed block diagram of mobile device 12. Mobile device 12 illustratively includes microprocessor 506, memory 508, input/output (I/O) components 510, and communication links 26. These components of mobile device 12 can be coupled for communication with one another over a suitable bus 516.

Memory 508 is illustratively implemented as nonvolatile electronic memory such as random access memory (RAM) with a battery back-up module (not shown) such that information stored in memory 508 is not lost when the general power to mobile device 12 is shut down. A portion of memory 508 is illustratively allocated as addressable memory for program execution, while another portion of memory 508 is optionally used for storage, such as to simulate storage on a disc drive.

Memory 508 can include operating system 518, one or more application programs (such as PIM 16 and file application 18, etc.), as well as object stores 20 and 22 and sync engine 24. During operation, operating system 518 is illustratively executed by processor 506 from memory 48. The operating system 518 implements features which can be utilized by PIM 16 and file application 18 through a set of exposed application programming interfaces and methods. The objects in object stores 20 and 22 are illustratively maintained by PIM 16, file application 18 and operating system 518, at least partially in response to calls to the exposed application programming interfaces and methods.

I/O components 510, in one embodiment, are provided to facilitate input and output operations from a user of mobile device 12. I/O components 510 for various embodiments of mobile device 12 can include input components such as buttons and touch sensors and output components such as a display, a speaker, and/or a printer port, etc.

Communication link 26 is any suitable communication interface. Interface 26 is illustratively used to communicate with computing device 14 as described with respect to FIG. 1. Memory 508 includes a set of communication drivers 520 that interact with communication link 26 and that translate data to and from the appropriate communication protocol necessary to allow for communication across link 26.

Figure 6:
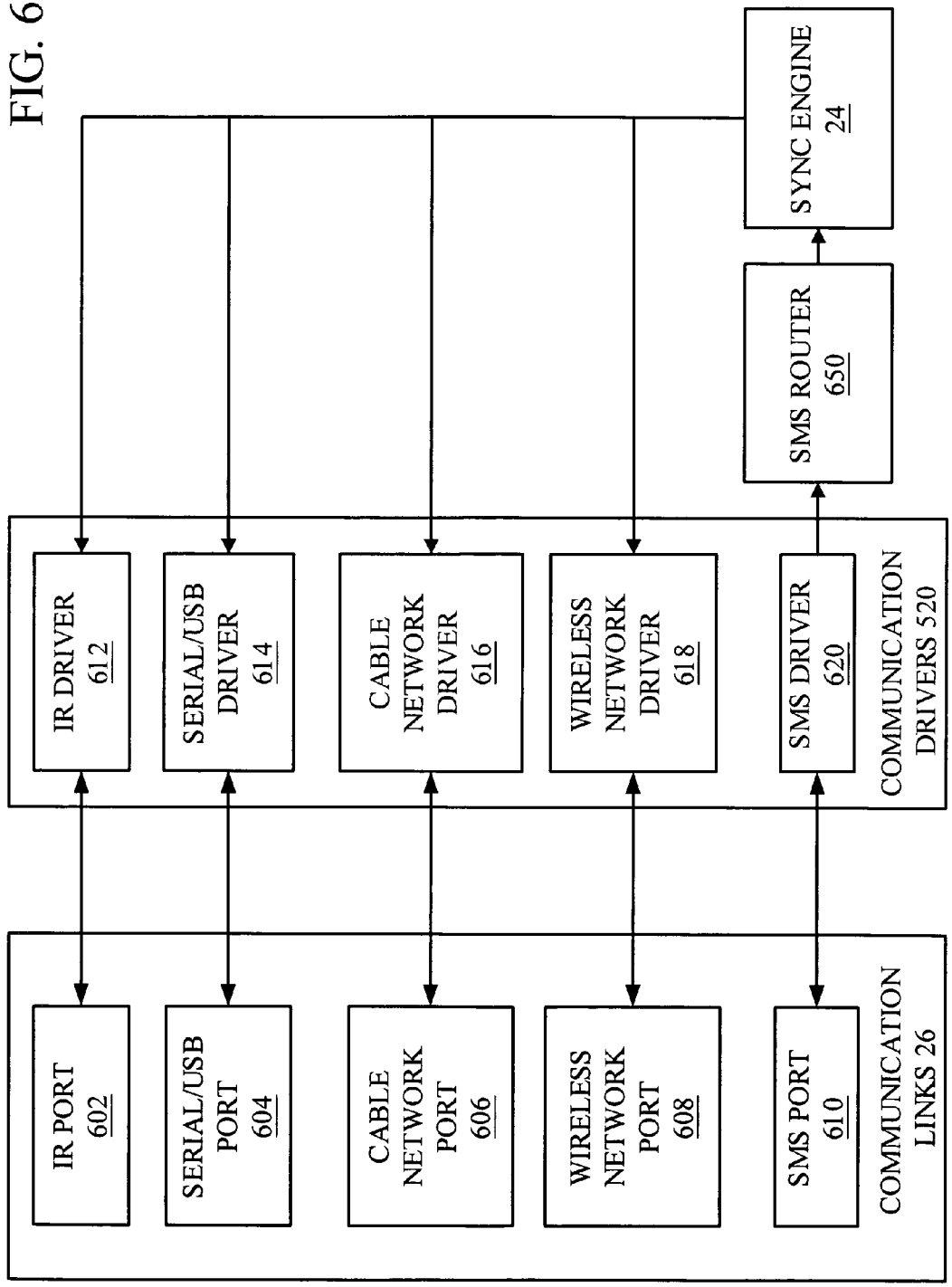
FIG. 6 is an architectural block diagram illustrating one embodiment of portions of the desktop computer shown in FIG. 2 and the mobile device shown in FIGS. 3-5 to illustrate synchronization of information stored in object stores on the desktop computer and the mobile device in accordance with one embodiment of the present invention.

FIG. 6 provides a block diagram showing communication link 26 and communication drivers 520 in more detail. In particular, FIG. 6 shows communication link 26 as containing a number of communication ports 602, 604, 606, 608 and 610 that communicate with devices outside of the mobile device.

Each port has an associated driver 612, 614, 616, 618, and 620, respectively, in communications drivers 520. IR port 602 and IR driver 612 provide communication across an infrared communication channel between the mobile device and another computing device. Serial/USB port 604 and Serial/USB driver 612 provide communication over a serial or USB channel. Cable network port 606 and cable network driver 616 provide communication over a network cable such as an Ethernet cable.

Wireless network port 608 and wireless network driver 618 provide communication to a network over a radio channel. Wireless network port 608 and driver 618 can use any number of wireless network protocols including General Packet Radio Service (GPRS) and 1Xrtt, which are wireless services used to provide cellular access to a network, as well as 802.11 and 802.11b (Wi-Fi) protocols, and Bluetooth™ protocol, which provide local wireless connections to networks. Of course, others can be used as well.

SMS port 610 and SMS driver 620 support one-way communication using the Short Message Service protocol. Thus, SMS port 610 is able to receive SMS messages that are broadcast using the radio spectrum.

Overview of Synchronization

Figure 7:
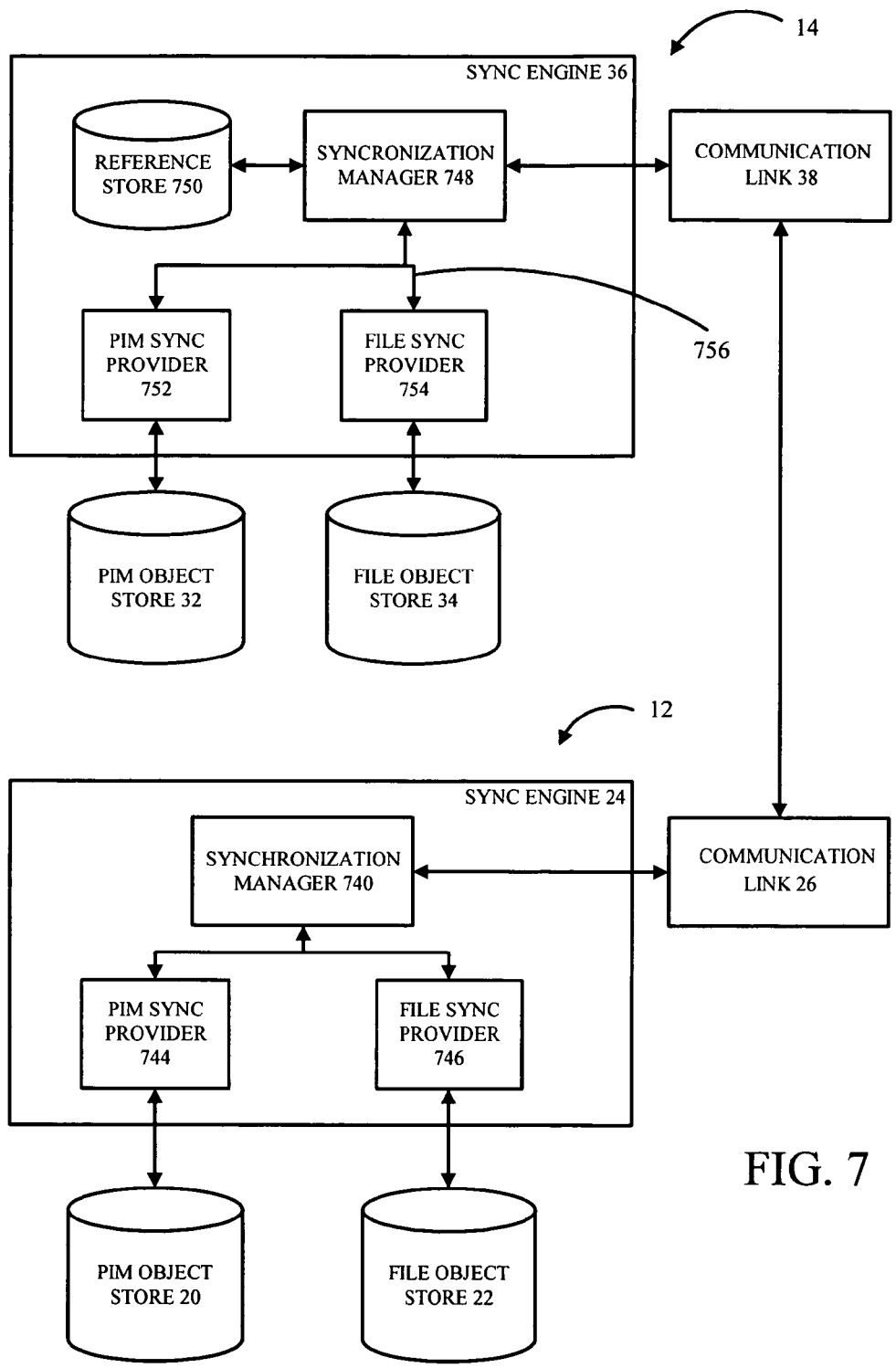
FIG. 7 is a more detailed block diagram of portions of sync engines shown in FIG. 1.

FIG. 7 is a more detailed block diagram of sync engine 24 on mobile device 12 and sync engine 36 on desktop 14. Sync engine 24 on mobile device 12 includes synchronization manager 740, which is coupled to a set of application programs, such as PIM sync provider 744 and file sync provider 746. PIM sync provider 744 is coupled to PIM object store 20, and file sync provider 746 is coupled to file object store 22.

Sync engine 36 on computing device 14 also includes a synchronization manager 748 coupled to an associated reference store 750 and also coupled to application programs, including PIM sync provider 752 and file sync provider 754. PIM sync provider 752 is coupled to PIM object store 32, and file sync provider 754 is coupled to file object store 34. While providers 744, 746, 752 and 754 are shown coupled directly to associated object stores, those providers could also be coupled to the object stores through the application programs 16, 18, 28 and 30 instead. However, for the sake of simplicity, the present discussion proceeds only with respect to the arrangement shown in FIG. 7.

Sync providers 752 and 754 expose application programming interfaces (APIs) 756 which can be called by sync manager 748 to read and store objects and object properties on object stores 32 and 34. The interfaces 756 generally allow the creation of data bases for different types of objects, and allow application programs to read and write property names and values to and from respective objects within each data base. A number of exemplary interfaces are now described, but form no part of the invention and are discussed for purposes of example and completeness only.

The interfaces are well documented as the IReplStore, and IReplObjHandler interfaces. Each of these interfaces exposes a number of well documented methods. For example, the IReplStore interface exposes 22 methods which can be generally classified as methods which are used to access and modify the data store, methods used for object enumeration, methods used to obtain object information, methods used to manipulate handles to objects, methods used for user interface functions, and a number of miscellaneous methods. The IReplObjHandler interface exposes methods which are used to serialize objects by turning an object into a series of bytes, and to deserialize objects by turning the series of bytes back into an object. The methods included in the interface are also used to delete an object from the corresponding object store.

Sync manager 748, in turn, exposes a well documented interface known as the IReplNotify interface to providers 752 and 754. This interface exposes four well documented methods which are used to notify sync manager 748 of any change or deletion made to an object in a corresponding object store, to set text to be displayed in a status bar where synchronization status can be observed by the user, to obtain a window handle which is used as a parent window of any modal dialogue or message box, and to obtain information about a mobile device which has been selected, or which is connected to the computing device.

Each of the providers 752 and 754 are implemented to specifically work in conjunction with a particular application program 28 or 34, respectively. In general, because the application program interface (API) 756 is standardized, it allows synchronization manager 748 to access and synchronize any number of different application programs, as long as the required interface methods are implemented for each application by corresponding providers.

On mobile device 12, providers 744 and 746 also provide the well documented IReplObjHandler interface such that objects in the associated object stores 20 and 22 can be serialized and deserialized. Providers 744 and 746 also illustratively implement three additional functions which can be used to initialize and terminate the provider, to handle object identification and change detection, and to retrieve device information about a particular object type. These functions and interfaces are also well documented.

Synchronization manager 748 manipulates reference store 750 to maintain a mapping between instances of objects stored in object stores 32 and 34 on computing device 14 and instances of the same objects stored in object stores 20 and 22 on mobile device 12. Objects are identified by handles which are created by providers 752 and 754. The handles are opaque to synchronization manager 748, in that synchronization manager 748 need not be concerned with the actual composition of the handles although the handles are manipulated and stored by synchronization manager 748.

Generally, in order to maintain the mapping, synchronization manager 748 maintains reference store 750 so that it contains handles corresponding respectively to a plurality of objects in the object stores 32 and 34 on computing device 14 which are to be synchronized with instances of the same objects in object stores 20 and 22 on mobile device 12. The handles in reference store 750 will typically correspond to objects that have been previously synchronized between the various object stores. The handles are updated after their corresponding objects have been synchronized.

The list of handles maintained in reference store 750 is also used to determine which items need to be synchronized to mobile device 12 the next time mobile device 12 is connected to computing device 14. In making this determination, synchronization manager 748 also determines whether objects have been added to or deleted from the object stores so that appropriate additions and deletions can be made.

The handles stored in reference store 750 may be formatted in accordance with the following criteria so that the synchronization providers 752 and 754 can perform the specified functions:

(a) Each handle may contain data that uniquely identifies an object—such as an object identifier, an ID number, a full pathname for a file system object, etc. This data may be persistent (in that it does not change for a particular object) and should not be reused for subsequently created objects. This data can be compared to determine whether two handles actually correspond to the same object. As is discussed below, this can be problematic for file system information, because the object identifier is typically the pathname, and can be changed simply by renaming the file.

(b) It may be possible to derive some object order based on the handle.

(c) The handle may have some sort of time stamp information, or version number. This information can be compared to determine whether an object has changed since the last handle was recorded in reference store 750.

These handles are provided from providers 752 and 754 to synchronization manager 748, for storage in reference store 750, during an enumeration process which is described below. This enumeration process is used to detect items which need to by synchronized when mobile device 12 is next coupled to computing device 14.

Figure 8A:
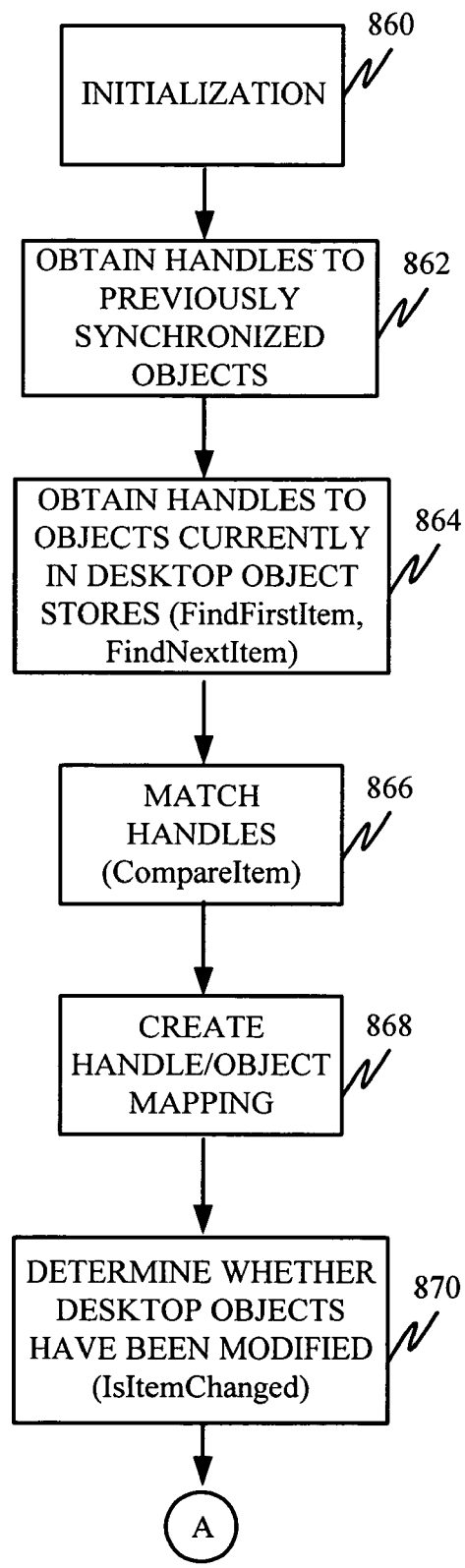
FIGS. 8A and 8B are flow diagrams illustrating a normal synchronization operation in accordance with one embodiment of the present invention.
Figure 8B:
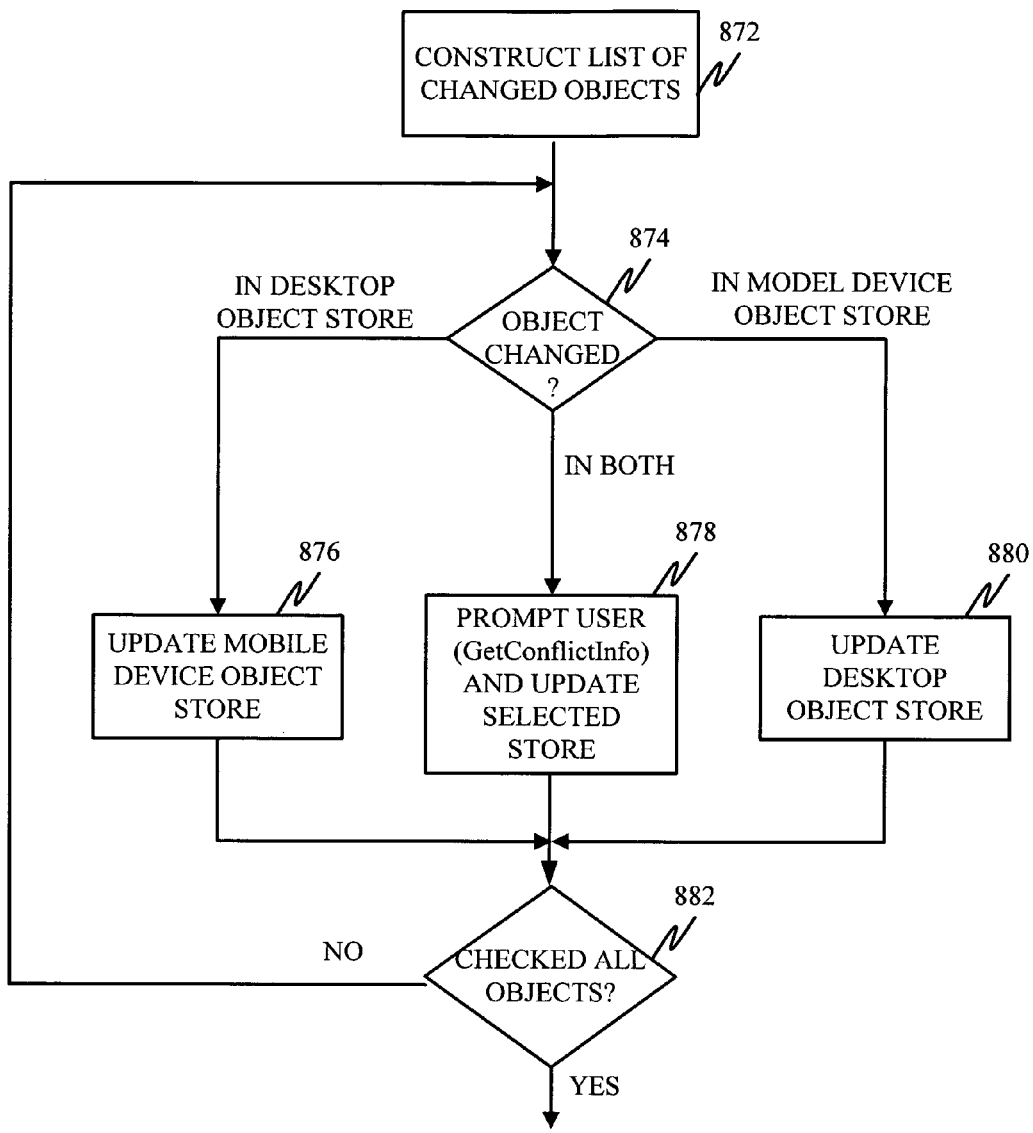

FIGS. 8A and 8B are flow diagrams illustrating the enumeration process which is periodically performed by sync engine 36 in obtaining and updating the list of handles stored in reference store 750 for the purpose of determining which items need to synchronized upon next connection. After an initialization step indicated by block 860, synchronization manager 748 constructs two lists of handles. The first list is obtained at step 862 by accessing the handles previously stored in reference store 750 that correspond to objects that were previously synchronized. The second list of handles is obtained at step 864 by querying each of the synchronization providers 752-754 using interface methods denoted by IReplObjHandler::FindFirstItem and FindNextItem. When successfully called, these interfaces enumerate an ordered list of handles corresponding respectively to a second group of objects, those objects currently in the object stores 32 and 34 corresponding to the providers 752 and 754 which have enumerated the objects.

By comparing the list of handles returned by the current enumeration with the saved list of handles loaded from reference store 750, synchronization manager 748 automatically detects changes and deletions. For example, each time a new object is returned during enumeration, synchronization manager 748 attempts to find an object in its previously saved list of objects which represents the same object. If no matching handle is found, synchronization manager 748 determines that a new object has been created and saved on the object store which enumerated the object under consideration. In order to determine whether matching handles are found, as is indicated by block 866, synchronization manager 748 calls the interface method IReplStore::CompareItem.

Based on a comparison of the handles, synchronization manager 748 creates any necessary handle-to-object mappings in reference store 750 such that objects in the object stores on computing device 14 can be mapped to corresponding instances of the same object on device 12. This is indicated by block 868.

Synchronization manager 748 also determines whether any objects have been added, deleted, or modified in the particular object store from which they were enumerated. This is indicated by blocks 870. For example, if the list of objects which were previously synchronized contains a handle that is not found in the newly created list based upon a current enumeration of synchronization providers 752-754, that indicates that the object has been deleted from the corresponding data store 32, 34. Thus, synchronization manager 748 determines that the object must also be deleted from the mobile device 12 during the next synchronization operation.

Similarly, if the enumeration of objects produces an object handle which does not occur in the list of objects previously synchronized, then synchronization manager 748 determines that an object corresponding to that particular handle has been added to the object store which enumerated the object. Thus, during the next synchronization operation, the object must be added to mobile device 12.

Synchronization manager 748 also calls the interface method IReplStore::IsItemChanged with matching handles from the first and second lists. Calling this interface causes the appropriate provider 752 or 754 (whichever enumerated the matching handle) to determine whether the object has changed since its handle was last written to reference store 750. In one illustrative embodiment, the provider examines the time stamp information or version number information associated with the object handle. If that information is not identical, that indicates that there has been a change to the object. Thus, during the next synchronization process, synchronization manager 748 must update the corresponding object on mobile device 12 (assuming there is no conflict as discussed below).

Synchronization manager 740 on mobile device 12 also interacts with synchronization providers 744 and 746 to determine whether any objects on object stores 20 and 22 have been added, deleted, or changed since the last synchronization process. On mobile device 14, the operating system posts a message to synchronization manager 740 every time an object on mobile device 12, which is to be synchronized, changes, is added, or is deleted. Synchronization manager 740 enumerates each object and calls methods in the IreplNotify interface of each provider 744 and 746. Based on this call, the provider determines whether the particular object enumerated is to be synchronized and indicates to synchronization manager 740 how many objects are to be synchronized (for example, a file system object, such as a directory, actually contains more than one object which is to be synchronized).

Based on the notifications posted from the operating system, synchronization manager 740 maintains a list, or array, of objects which have changed, been deleted, or added since the last synchronization process. Upon connection to computing device 14, this list is provided to synchronization manager 748. Thus, synchronization manager 748 contains the lists which have been constructed for both desktop 14 and mobile device 12 which indicate objects which need to be synchronized. This is indicated by block 872 in FIG. 8B.

Synchronization manager 748 then determines, as indicated at block 874, whether an object has changed only on mobile device 12, only on computing device 14, or on both mobile device 12 and computing device 14. If the object has changed only on one of the desktop object stores, then synchronization manager 748 carries out the necessary activity to update the corresponding object store on the mobile device. This is indicated by block 876. If the object has changed only on one of the mobile device stores, then synchronization manager 748 carries out the necessary activities to update the corresponding object store on the computing device 14. This is indicated by block 880.

However, if the same object has changed on both mobile device 12 and computing device 14, then a conflict situation arises. In one illustrative embodiment, synchronization manager 748 makes a call to the registry in the operating system of computing device 14 to obtain conflict information which instructs synchronization manager 748 how to proceed in the face of a conflict. This is indicated by block 878. For example, the user may have set preferences which indicate that, in the case of a conflict either the desktop computer version, or the mobile device version should take precedence every time. Similarly, the user may have set a preference which indicates that the user is to be notified in the case of a conflict so that the user can actively decide which version will take precedence.

In that case, synchronization manager 748 generates a user interface allowing the user to resolve the conflict. Synchronization manager 748 then takes the necessary steps to resolve the conflict and update the appropriate object store. This continues until all objects in the lists of objects to be synchronized have been dealt with. This is indicated by block 882.

In order to exchange objects with mobile device 12, synchronization manager 748 continually calls the method IReplObjHandler:GetPacket to have an appropriate provider 752 or 754 obtain a packet of information to be transmitted to mobile device 12. To handle a packet received from mobile device 12, synchronization manager 748 calls IReplObjHandler::SetPacket. This acts to provide a packet of information received from mobile device 12 to a synchronization provider 754 for storage on its associated object store. Similar interfaces are called by synchronization manager 740 on mobile device 12.

Scheduling Synchronization Operations

When performing synchronization operations over a wireless link, such as a cellular link, a number of concerns present themselves. First, it is desirable that the user of the mobile device 12 has as up-to-date information as possible. Therefore, frequent sync operations may be desirable. However, sync operations require, in one embodiment, cellular connection to a synchronization server. This can undesirably affect the remaining battery life of the mobile device 12, if it is necessary to connect frequently. Similarly, cellular charges can undesirably increase the cost of synchronization, especially when the mobile device is roaming relative to the synchronization server.

In one system, wireless synchronization operations were simply scheduled to be performed on a regular, periodic basis such as every two hours, or every one hour, etc. However, this does not address all of the concerns.

One embodiment of the present invention provides a robust mobile schedule that, in various embodiments, includes a variety of different features to address the different concerns associated with scheduling synchronization operations. For example, in one embodiment, a user can select a frequency with which synchronization operations are to be performed during different periods of the day (such as peak usage time and off-peak usage time). Another feature of the present invention allows the user to invoke a roaming override functionality in which a roaming synchronization schedule is implemented when the mobile device is roaming. Yet another embodiment of the present invention allows the user to configure the mobile device to force a synchronization operation each time one of a predefined subset of operations is performed that triggers a synchronization operation.

FIG. 9 shows one embodiment of a user interface 900 generated on a mobile device 12 for setting the frequencies with which synchronization operations are performed during different times of the day, and when the mobile device 12 is roaming. User interface 900 includes a peak time sync field 902, and off peak sync field 904 and a roaming sync field 906. User interface 900 also includes peak times setting button 908.

In one embodiment, the user can select which times of day are peak times and which times are non-peak times. For instance, it is believed that when a user is working and receiving large numbers of electronic mail messages, it is likely that the user may want to have synchronization operations performed frequently to ensure that the information they are viewing and manipulating is up-to-date. However, during non-work hours, the user may not be as concerned as to whether the data is up-to-date. However, some users desire data that is up-to-date regardless of whether it is a peak or non-peak time.

The user sets peak and non-peak times using button 908. If the user actuates button 908, another user interface appears which allows the user to designate which hours of the day are peak times. The remaining hours can be assumed to be non-peak times, or non-peak times can be designated by the user as well. Once the peak and non-peak times have been identified by the user, the user can actuate the buttons within fields 902 and 904 to adjust the frequency (during peak and non-peak times) with which synchronization operations are to be performed.

The user may wish to have these schedules overridden when certain criteria are present. For instance, by actuating the button in field 906, the user can select a sync schedule that is to be implemented when the mobile device is roaming. For example, the user can select a schedule which only synchronizes when the user manually triggers a synchronization process. Alternatively, the synchronization operations can be set completely to be completely precluded while the mobile device is roaming, or they can be set to a specific frequency, chosen by the user.

Figure 10:
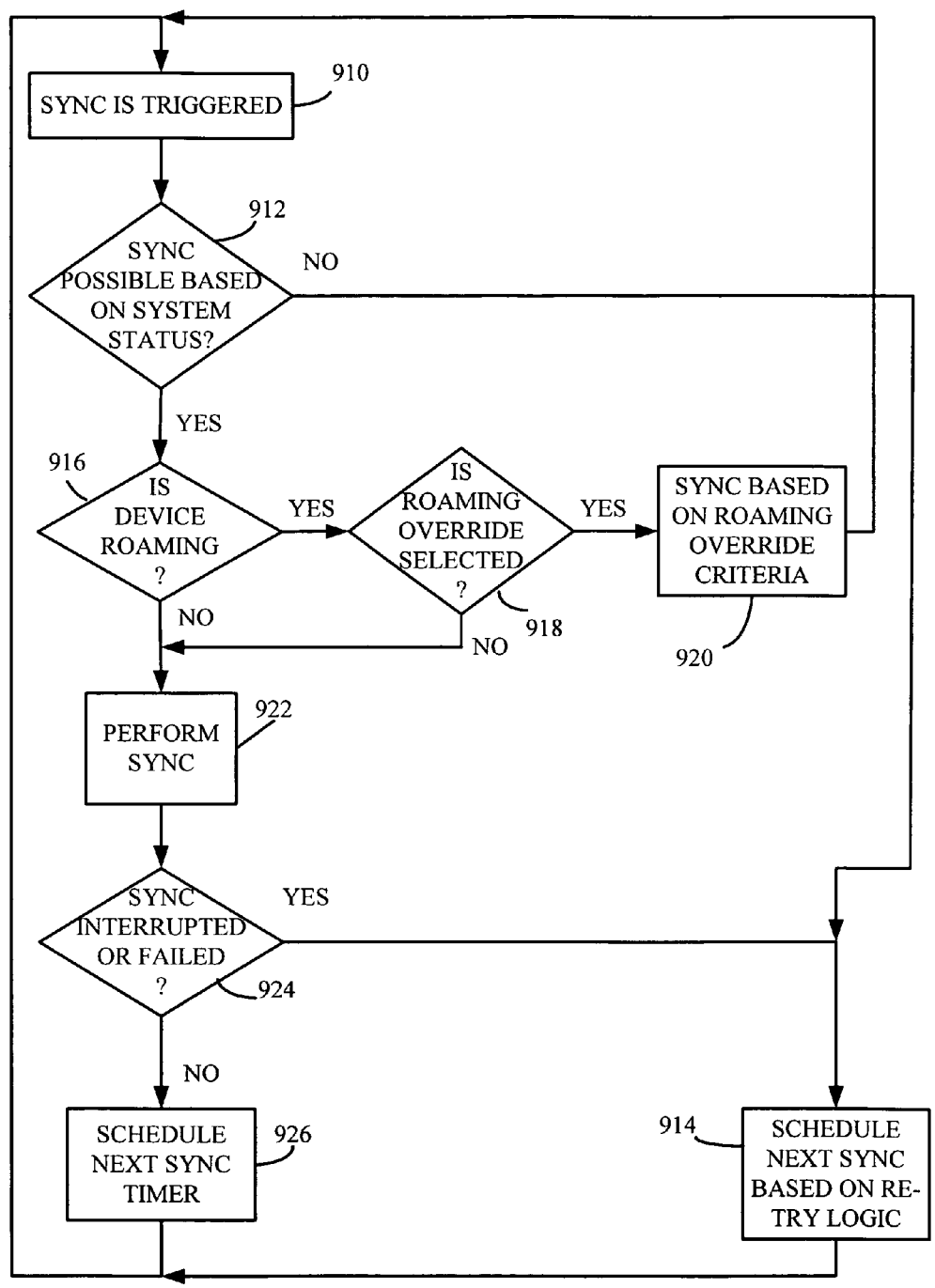
FIG. 10 is a flow diagram illustrating scheduling of sync operations during peak and off-peak times in accordance with one embodiment of the present invention.

FIG. 10 is a flow diagram better illustrating how the sync scheduling works on the mobile device 12. First, a synchronization operation is triggered, such as by reaching a time when the next sync is scheduled. This is indicated by block 910. Next, it is determined whether the sync is even possible based on system status. For example, if the cellular radio circuitry on the mobile device 12 has been turned off, or if the user is on a voice telephone call, of if the synchronization network is somehow unavailable, then synchronization is not possible. In that case, a next synchronization is scheduled based on re-try logic which is described in greater detail below. Determining whether the sync is possible and syncing based on re-try logic is indicated by blocks 912 and 914 in FIG. 10.

If, at block 912, it is determined that the synchronization process is possible, then it is determined whether any override criteria are present, in this case, whether the mobile device 12 is roaming. This is indicated by block 916. If the device is roaming, then it is determined whether the user has selected one of the roaming override functions in field 906 of the user interface 900 shown in FIG. 9. This is determined by block 918. If so, then synchronization is performed according to the roaming override schedule, as indicated by block 920. For example, if synchronization is only to be performed when it is manually initiated, then the synchronization operation is not performed until that occurs.

If, at block 916 it is determined that the mobile device is not roaming, or, at block 918 it is determined that the user has not selected a roaming override function, then the synchronization operation is performed as indicated by block 922. If the synchronization is interrupted or fails, this is determined at block 924 and another synchronization operation is scheduled based on the re-try logic.

The re-try logic can be any suitable logic algorithm. For instance, one such algorithm will initiate a re-try after a minimum desired time lapse (such as three minutes) and a maximum desired re-try time (which is equal to the next scheduled sync time). For example, assume that the mobile device 12 is operating in non-peak time and that it is scheduled to sync every 60 minutes during non-peak time. Assume that a sync operation is triggered and that the sync operation fails. One exemplary algorithm retries the sync operation at intervals of three minutes, six minutes, twelve minutes, twenty-four minutes, forty-eight minutes and sixty minutes. The last re-try interval is not ninety-six minutes, because the user has scheduled the sync operations to occur every sixty minutes.

If, at block 924, the sync has not failed, but is successful, then the next sync timer is scheduled in accordance with whether it is currently peak or non-peak time and the user's selections as illustrated with respect to FIG. 9. This is indicated by block 926.

In accordance with one embodiment of the present invention, sync timers are triggered based on the starting time of a current sync operation. For example, if the present sync operation starts at 10:00 a.m., and sync operations are scheduled to be performed every five minutes, then the next sync operation is triggered at 10:05 a.m., regardless of how long the current sync operation took to perform. This can be disadvantageous, however. For example, if the current sync operation takes 4.5 minutes, then the next sync operation will be triggered 30 seconds after the current sync operation concludes. This can have the undesirable results of tying up the mobile device 12 more frequently than necessary, draining the battery faster than necessary, and consuming synchronization server time.

Therefore, in accordance with another embodiment of the present invention, the next sync timer is scheduled at block 926 beginning from the end of the current sync operation. Therefore, if the current sync operation started at 10:00 a.m. and finished at 10:03 a.m., and the sync timers are scheduled to be set every five minutes, then the next sync timer will be scheduled to trigger at 10:08 a.m.

When synchronizing on a mobile schedule, where synchronization operations occur at regular time intervals, it is possible that a significant amount of time can elapse between synchronization operations. However, between synchronization operations, a user may well be composing, forwarding and replying to electronic mail messages, as well as possibly marking some messages or attachments for download, and sending and responding to meeting requests. To compensate for the time difference between a current action of the user and the next scheduled meeting request, the mobile device can be configured to schedule meeting requests based on actions taken by the user, instead of simply based on elapsed time.

In accordance with another embodiment of the present invention, the user can configure the mobile device to initiate a sync operation when one of a preselected subset of operations is performed on the mobile device that would otherwise trigger a sync. In other words, there are a wide variety of different operations which can be taken on the mobile device and which would normally trigger a sync operation. The user may simply read a message, delete a message, reply to a message, forward a message, etc. While all of these operations would normally trigger a sync operation, it may not be desirable to initiate an immediate sync operation for all of these. For example, it may not be desirable to initiate an immediate, remote sync operation simply when the user deletes a message from the In-Box of an electronic mail application program. Similarly, it may not be desirable to initiate an immediate, remote sync simply because the user selects an electronic mail operation to read. However, it may be desirable to initiate such a synchronization operation during other actions, such as those that send an electronic mail transmission, or such as when an attachment or electronic mail message is selected to be downloaded to the mobile device 12. Such actions can include, for example, sending a new electronic mail message, replying to or forwarding an electronic mail message, responding to meeting requests or generating a meeting request, requesting more data from an item, such as a body of message text or attachments, to be down loaded, etc.

Figure 11:
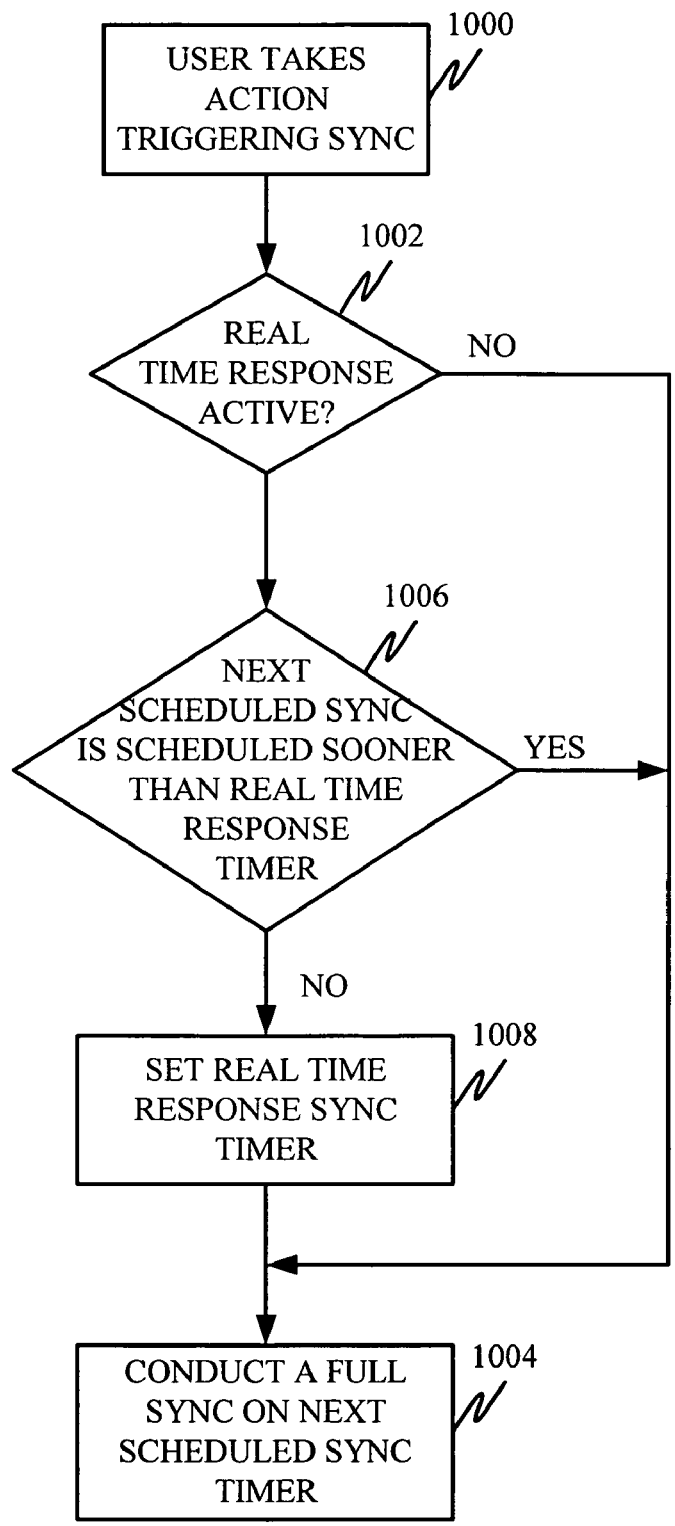
FIG. 11 is a flow diagram illustrating a real time response process for scheduling sync operations in accordance with one embodiment of the present invention.

FIGS. 11-12C illustrate an embodiment of the present invention in which these actions can be used to initiate a synchronization operation. First, the user takes an action which triggers a synchronization operation. This is indicated by block 1000. As mentioned, these actions will likely be a preselected subset of actions which the user can take on the mobile device, and maybe those actions which generate an outgoing electronic mail message, or identify information to be downloaded.

It is next determined whether the real time response feature that automatically initiates a synchronization operation based on these actions (rather than waiting for the next scheduled sync operation) is active. This is indicated by block 1002. FIGS. 12A-12C illustrate different user interfaces which allow the user to select the real time response feature. FIG. 12A is similar to FIG. 9, except that it also includes a box labeled "Sync outgoing items as they are sent". This is designated by number 1100 in FIG. 12A. If the user checks this box, then synchronization operations are initiated when the user takes any of the predetermined subset of actions that trigger a real time response synchronization operation. FIG. 12B is simply a different embodiment of a user interface but also contains the check box 1100, as does the user interface indicated in FIG. 12C.

It should be noted that it may be desirable to schedule real time response synchronization operations based on the user's actions, not immediately, but after a predetermined, relatively short, time delay. This time delay can be specified by the user, or it can be automatically set by the mobile device 12. For example, the user may be responding to a large number of emails at one time. Therefore, the synchronization operation may illustratively be delayed for a short period of time, such as five minutes, after the user has responded to an electronic mail message. This facilitates batching items which are to be synchronized from the mobile device. This reduces the frequency with which the wireless connection to the synchronization server must be established and torn down.

In any case, once the user takes an action which triggers the synchronization operation at block 1000, it is determined whether the user has selected the real time response feature on the user interfaces shown in FIGS. 12A-12C. This is indicated by block 1002. If the user has not selected these features, then a full synchronization operation is simply performed on the next scheduled synchronization timer. This is indicated by block 1004.

If, however, at block 1002, it is determined that the user has selected the real time response feature, then it is determined whether the next regularly scheduled synchronization operation is scheduled to trigger sooner than the real time response timer. In other words, if the delay time between an action triggering a synchronization operation under the real time response feature is longer than the delay to the next regularly schedule synchronization operation, this is determined at block 1006. If so, that means that the next regularly scheduled synchronization operation will actually take place before the real time response timer would trigger a synchronization operation. Therefore, the normal, regularly scheduled synchronization operation is simply performed as scheduled at block 1004.

If, however, the real time response timer would schedule the synchronization operation prior to the next regularly scheduled operation, then the real time response synchronization timer is set, as indicated by block 1008, and synchronization is performed at that time. In one illustrative embodiment, the next regularly scheduled synchronization is not altered, even if the real time response synchronization timer schedules an earlier synchronization operation. However, this could be modified as well so that the next regularly scheduled synchronization operation is delayed for a predetermined delay time after the real time response synchronization timer has triggered a synchronization operation.

It should be noted that, in one illustrative embodiment, the synchronization operations discussed herein can be background synchronization operations. In that embodiment, no user interface items interrupt the user, and the synchronization operations are performed purely in the background.

Although the present invention has been described with reference to preferred embodiments, workers skilled in the art will recognize that changes may be made in form and detail without departing from the spirit and scope of the invention.

What is claimed is:

1. A method of synchronizing data between a mobile device and a computing device over a wireless link, comprising:
    setting a synchronization schedule, retained on a computer storage medium of at least one of the mobile device and the computing device, which indicates how frequently synchronization operations are to occur during a plurality of different time periods throughout a day, wherein the synchronization schedule is configurable to schedule the synchronization operations to occur more frequently during some of the plurality of different time periods than during other of the plurality of different time periods throughout the day, and wherein setting the synchronization schedule comprises:
        designating a time period of the plurality of different time periods as a peak time period or as a non-peak time period; and
        setting at least one frequency with which the synchronization operations are to be performed during the peak time period, during the non-peak time period, or during both the peak time period and the non-peak time period; and
    performing at least one of the synchronization operations to synchronize data between the mobile device and the computing device.

2. The method of claim 1 wherein the synchronization schedule includes a user-configurable frequency indication indicative of how frequently the synchronization operations are to be performed during the plurality of different time periods and wherein setting the synchronization schedule comprises:
    identifying, as a current time period, one of the plurality of different time periods that corresponds to the current time of day; and
    accessing the user configurable frequency indication corresponding to the current time period.

3. The method of claim 2 wherein setting the synchronization schedule comprises:
    scheduling the at least one synchronization operation based on the user configurable frequency indication corresponding to the current time period.

4. The method of claim 3 wherein the user configurable frequency indication includes a time value indicative of a time period after which a next synchronization operation is to be performed, and wherein setting the synchronization schedule comprises:
    scheduling the next synchronization operation to be performed after the time value has elapsed, beginning from an end of a previous synchronization operation.

5. The method of claim 2 wherein the plurality of different time periods comprise user definable time periods.

6. The method of claim 2 and further comprising:
    identifying whether over-ride criteria are present; and if so, performing synchronization operations according to an over-ride schedule.

7. The method of claim 6 wherein the over-ride schedule is a user configurable schedule.

8. The method of claim 6 wherein the wireless link comprises a cellular communication link and wherein identifying whether over-ride criteria are present comprises:
    determining whether the mobile device is in a roaming state.

9. A user interface on a mobile device, comprising: a first portion retained on a computer storage medium of the mobile device, the first portion being configured to receive and display a user input indicative of how frequently a synchronization operation for synchronizing data with a computing device is to be performed during a peak time period during a day; a second portion retained on the computer storage medium of the mobile device, the second portion being configured to receive and display a user input indicative of how frequently a synchronization operation is to be performed during a non peak time period during the day, different from the peak time period, each of the peak and non-peak time periods being pre-defined multiple hour time periods with multiple synchronization operations scheduled therein; and a third portion retained on the computer storage medium of the mobile device, the third portion being configured to allow the user to designate a time period throughout the day as the peak time period or as the non-peak time period.

10. The user interface of claim 9 and further comprising:
    a fourth portion displaying a user input indicative of a desired over-ride synchronization frequency when over-ride criteria are present.

11. A mobile device, comprising:
    a synchronization component, retained on a computer storage medium of the mobile device, and configured to be coupled to a computing device through a wireless link and to perform synchronization operations to synchronize information with the computing device; a scheduler component retained on the computer storage medium, that schedules the synchronization operations to occur according to a synchronization schedule that varies how frequently the synchronization operations occur during different time periods throughout a day, wherein the scheduler component schedules a plurality of synchronization operations to be performed in each of the different time periods; and a user interface retained on a computer storage medium of the mobile device, and configured to receive user inputs and to provide the user inputs to the scheduler component, the user inputs comprising: a first user input that designates a time period throughout the day as a peak time period or as a non-peak time period;
    and a second user input that sets at least one frequency with which the synchronization operations are to be performed during the peak time period, during the non-peak time period, or during both the peak time period and the non-peak time period.

12. The mobile device of claim 11 wherein the scheduling component is configured to schedule synchronization operations by setting a sync timer to a time value, wherein the synchronization operation is triggered when the sync timer reaches the time value.

13. The mobile device of claim 11 wherein the scheduler component is configured to receive a user input indicative of the synchronization schedule, the synchronization schedule including a user-input frequency indication associated with each of a plurality of time periods throughout the day.

14. The mobile device of claim 13 wherein the scheduler component is configured to schedule synchronization operations to occur as frequently as indicated by the user-input frequency indication associated with one of the plurality of time periods that corresponds to the current time of day.

15. The mobile device of claim 14 wherein the scheduler component is configured to receive a user input defining each of the plurality of different time periods.

16. The mobile device of claim 11 wherein the synchronization schedule includes an over-ride schedule indicative of a schedule according to which synchronization operations are to be performed when an over-ride criteria is present.

17. The mobile device of claim 16 wherein the over-ride schedule is based on a user input.

18. The mobile device of claim 17 wherein the over-ride schedule is user-selectable.

19. A method of synchronizing data on a mobile device with data on a computing device, and through a server, comprising:
    setting a synchronization schedule, retained on a computer storage medium of the mobile device, which indicates how frequently synchronization operations are to occur, through the server, during a plurality of different time periods throughout a day, wherein the synchronization schedule is configurable to schedule the synchronization operations to occur more frequently during some of the plurality of different time periods than during other of the plurality of different time periods throughout the day; and wherein setting the synchronization schedule comprises:
        designating a time period of the plurality of different time periods as a peak time period or as a non-peak time period; and
        setting at least one frequency with which the synchronization operations are to be performed during the peak time period, during the non-peak time period, or during both the peak time period and the non-peak time period; and
    performing at least one of the synchronization operations to synchronize data between the mobile device and the computing device through the server.

20. The method of claim 19 wherein the synchronization schedule includes a user-configurable frequency indication indicative of how frequently the synchronization operations are to be performed during the plurality of different time periods and wherein setting the synchronization schedule comprises:
    identifying, as a current time period, one of the plurality of different time periods that corresponds to the current time of day; and
    accessing the user configurable frequency indication corresponding to the current time period.

21. The method of claim 20 wherein setting the synchronization schedule comprises:
    scheduling the at least one synchronization operation based on the user configurable frequency indication corresponding to the current time period.

22. The method of claim 21 wherein the user configurable frequency indication includes a time value indicative of a time period after which a next synchronization operation is to be performed, and wherein setting the synchronization schedule comprises:
    scheduling the next synchronization operation to be performed after the time value has elapsed, beginning from an end of a previous synchronization operation.

23. The method of claim 20 wherein the plurality of different time periods comprise user definable time periods.

24. The method of claim 20 and further comprising:
    identifying whether over-ride criteria are present; and
    if so, performing synchronization operations according to an over-ride schedule.

25. The method of claim 24 wherein the over-ride schedule is a user configurable schedule.

26. The method of claim 24 wherein the wireless link comprises a cellular communication link and wherein identifying whether over-ride criteria are present comprises:
    determining whether the mobile device is in a roaming state.

* * * * *